United States Patent
Dallapiccola et al.

(10) Patent No.: US 12,467,528 B2
(45) Date of Patent: Nov. 11, 2025

(54) LUBRICANT COLLECTION ASSEMBLY

(71) Applicant: DANA ITALIA S.R.L., Arco (IT)

(72) Inventors: Matteo Dallapiccola, Arco (IT); Andrea Bortoli, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/480,417

(22) Filed: Oct. 3, 2023

(65) Prior Publication Data

US 2024/0110623 A1 Apr. 4, 2024

(30) Foreign Application Priority Data

Oct. 4, 2022 (DE) ............ 20 2022 105 597.1

(51) Int. Cl.
*F16H 57/04* (2010.01)

(52) U.S. Cl.
CPC ....... *F16H 57/045* (2013.01); *F16H 57/0421* (2013.01)

(58) Field of Classification Search
CPC . F16H 57/0424; F16H 57/045; F16H 57/0421
See application file for complete search history.

(56) References Cited

U.S. PATENT DOCUMENTS

| | | | | |
|---|---|---|---|---|
| 1,623,728 A * | 4/1927 | Hooton | ............... | F16N 39/06 184/6.24 |
| 6,237,720 B1 * | 5/2001 | Sutton | ............... | F01M 11/0004 184/106 |
| 8,733,528 B1 * | 5/2014 | Goerend | ............ | F16H 57/0445 184/6.12 |
| 8,757,224 B2 * | 6/2014 | Treacy | ................ | F16N 31/004 184/106 |
| 12,215,774 B2 * | 2/2025 | Stefani | ............... | F16H 57/0424 |
| 2021/0140532 A1 * | 5/2021 | Farnum | ............... | F16H 57/03 |
| 2024/0110623 A1 * | 4/2024 | Dallapiccola | ...... | F16H 57/0409 |
| 2024/0175486 A1 * | 5/2024 | Stefani | ............... | F16H 57/0453 |

* cited by examiner

*Primary Examiner* — Michael A Riegelman
(74) *Attorney, Agent, or Firm* — McCoy Russell LLP

(57) ABSTRACT

The present disclosure relates to a lubricant collection assembly, comprising:
 a lubricant sump, and
 at least one guide member having a surface configured to guide a lubricant toward and/or into the lubricant sump along the surface, wherein the surface includes a plurality of protrusions and/or deepenings to slow a flow of lubricant toward the lubricant sump.

17 Claims, 6 Drawing Sheets

LUBRICANT COLLECTION ASSEMBLY

CROSS-REFERENCE TO RELATED APPLICATION

The present application claims priority to German Utility Model Application No. 20 2022 105 597.1, entitled "LUBRICANT COLLECTION ASSEMBLY", and filed Oct. 4, 2022. The entire contents of the above-listed application is hereby incorporated by reference for all purposes.

TECHNICAL FIELD

The present disclosure relates to a lubricant collection assembly including a lubricant sump and a guide member for guiding lubricant toward and/or into the lubricant sump. Lubricant collection assemblies of the aforementioned type may find application in mechanical transmissions, for example.

BACKGROUND AND SUMMARY

Lubricants such as oil are typically used to lubricate and/or cool moving components of a mechanical system such as shafts or gears of a mechanical transmission. Increasing the amount of lubricant may enhance cooling, reduce or slow chemical degradation of the lubricant and may further dilute metallic particles in the lubricant which may be produced by abrasion between moving components. On the other hand, increasing the amount of lubricant may result in additional power loss due to splashing and churning of moving components submerged in the lubricant.

Thus, there is demand for a lubrication system which may benefit from increasing an amount of lubricant held within the system while mitigating power losses.

This demand is met by a lubricant collection assembly including the features as described herein.

The presently proposed lubricant collection assembly comprises a lubricant sump and at least one guide member having a surface configured to guide a lubricant toward and/or into the lubricant sump along the surface, for example exclusively under the influence of gravity, which would be vertically downward in FIG. 1 with the assembly positioned as shown in FIG. 1, when the assembly is mounted in a vehicle on level ground, for example. The surface of the guide member includes a plurality of protrusions and/or deepenings to slow a flow of lubricant toward the lubricant sump along the surface.

Slowing the flow of lubricant along the surface of the at least one guide member may result in a smaller quantity of lubricant held in the lubricant sump at a given time per amount of lubricant held within the system. This may reduce power losses which may be caused by splashing or churning components submerged in the lubricant sump, for example.

The plurality of protrusions and/or deepenings may be formed in one piece with the at least one guide member.

The lubricant collection assembly may include one or more rotatable elements disposed at least partially in the lubricant sump. Additionally or alternatively, the lubricant collection assembly may include a lubricant pump. The one or more rotatable elements and/or the lubricant pump may be configured to convey a lubricant held within the lubricant sump onto the surface of the at least one guide member.

The lubricant collection assembly may include a housing enclosing the lubricant sump. The one or more rotatable elements may then be mounted on the housing. The at least one guide member may be formed in one piece with the housing.

The plurality of protrusions and/or deepenings may form a periodic pattern. For example, the at least one guide member may have a corrugated surface. The corrugated surface may include corrugations extending transverse to a direction of gravity at least partially. The surface protrusions of the at least one guide member may extend at least partially transverse or perpendicular to the direction of gravity.

Additionally or alternatively, a section of the plurality of protrusions and/or deepenings parallel to a direction of gravity may comprise a saw tooth profile. The plurality of protrusions and/or deepenings may have rounded edges.

The surface of the guide member may comprise first surface portions, each of the first surface portions extending, in a direction of fluid flow along the surface of the guide member under the influence of gravity, from a valley formed by one of the plurality of deepenings to a neighboring crest formed by one of the the plurality of protrusions. And the surface of the guide member may comprise second surface portions, each of the second surface portions extending, in a direction of fluid flow along the surface of the guide member under the influence of gravity, from a crest formed by one of the plurality of protrusions to a neighboring valley formed by one of the plurality of deepenings.

A maximum slope of the first surface portions with respect to a horizontal plane may enclose an angle $\alpha_1$ with the horizontal plane, wherein 1.5 degrees$<\alpha_1<$5 degrees. Additionally or alternatively, a maximum slope of the second surface portions with respect to the horizontal plane may enclose an angle $\alpha_2$ with the horizontal plane, wherein 10 degrees$<\alpha_2<$45 degrees. A maximum slope of the first surface portions and a maximum slope of the second surface portions with respect to the horizontal plane may enclose an angle $\alpha_3$, wherein 10 degrees$<\alpha_3<$55 degrees.

The at least one guide member may be made of or may comprise metal, for example a sheet metal. Alternatively, the at least one guide member may be made of or may comprise cast iron. Alternatively, the at least one guide member may be made of or may comprise a plastic material.

Embodiments of the presently proposed subject matter are illustrated in the accompanying drawing and are described in the following detailed description.

DETAILED DESCRIPTION

Figure 1:
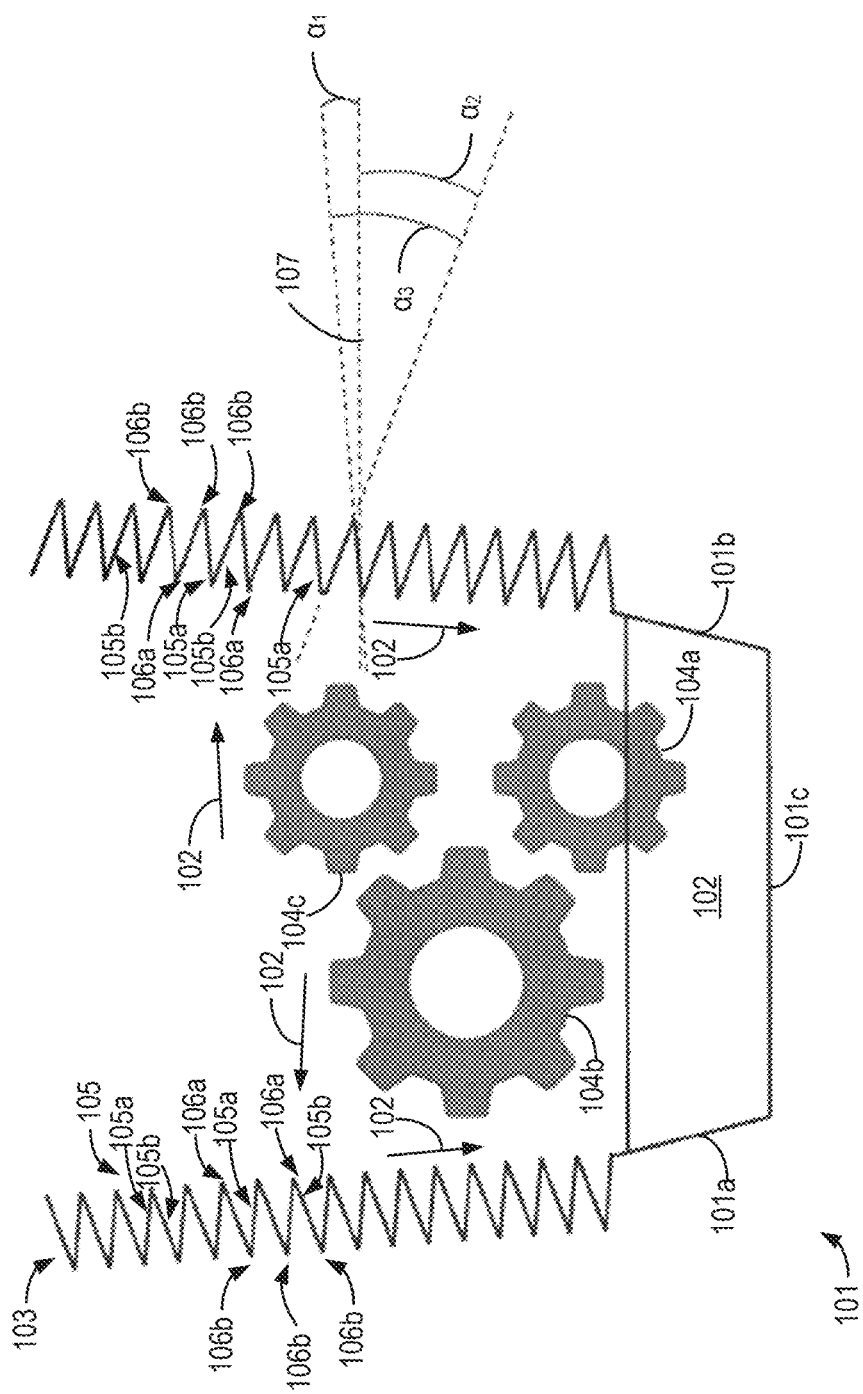
FIG. 1 schematically shows a sectional view of a lubricant collection assembly including a fluid sump and guide members for guiding fluid into the lubricant sump according to a first embodiment.

FIG. 1 schematically shows a sectional view of a lubricant collection assembly 100 according to a first embodiment. The lubricant collection assembly 100 includes a lubricant sump 101 partially filled with a lubricant 102 such as oil, guide members 103, and gears 104a-c. The lubricant sump 101 is formed by side walls 101a, 101b and a floor 101c. The guide members 103 are arranged above or at least partially above the lubricant sump 101. In the embodiment depicted here, the guide members 103 extend from the side walls 101a, 101b of the lubricant sump 101. The guide members 103 transition into the side walls 101a, 101b. The guide members 103 extend in a direction which is slightly inclined with respect to a vertical direction defined by the direction of gravity.

The gear 104a is partially submerged in the lubricant 102 held in the lubricant sump 101. The gear 104a meshes with the gear 104b, and the gear 104b meshes with the gear 104c. Upon rotation of the gears 104a-c, the gears 104a-c may convey at least some of the lubricant 102 held in the lubricant sump 101 upward and onto surfaces 105 of the guide members 103. Additionally or alternatively, the lubricant collection assembly 100 may also include a lubricant pump for conveying lubricant onto the surfaces 105 of the guide members 103. Lubricant 102 conveyed onto the surfaces 105 of the guide members 103 is guided back toward and into the lubricant sump 101 along the surfaces 105 under the influence of gravity or exclusively under the influence of gravity. In FIG. 1, arrows 102 further indicate lubricant conveyed onto the guide members 103 by the gears 104a-c, and lubricant flowing along the surfaces 105 toward and/or back into the lubricant sump 101.

In order to slow a flow of lubricant flowing towards the lubricant sump 101, the surfaces 105 of the guide members 103 include a plurality of protrusions 106a and deepenings 106b. Slowing the flow of lubricant along the surfaces 105 of the guide members 103 may allow increasing the amount of lubricant in the system without simultaneously increasing a lubricant level in the lubricant sump 101 at a given instant. In this way, advantages such as improved cooling of mechanical components, reduced chemical degradation of the lubricant and enhanced dilution of debris dispersed in the lubricant 102, which are typically correlated with an increased amount of lubricant in the system, may be realized without producing additional power loss generated by increased lubricant levels in the lubricant sump 101.

In the embodiment depicted in FIG. 1, the guide members 103 may be made of a sheet metal such as steel, iron, or aluminium, for example. However, it is understood that in alternative embodiments the guide members 103 may be made of or may comprise other materials such as cast iron or a plastic material. For instance, the lubricant collection assembly 100 of FIG. 1 may include a housing and the lubricant sump 101 may be disposed or formed within said housing. In this case, the guide members 103 may possibly be formed in one piece with the housing, and/or the gears 104a-c may be mounted on the housing. The housing may then be made of cast iron, which is common for housings of automotive transmissions, for example.

Here, the protrusions 106a and the deepenings 106b are formed in one piece with the guide members 103. For instance, the guide members 103 may be made by forming or bending a sheet metal. For example, the guide members 103 may be or may include corrugated metal sheets, respectively, wherein the protrusions 106a and deepenings 106b are formed by the crests and valleys of the corrugations. The corrugations may extend in a horizontal direction, perpendicular to the plane of projection of FIG. 1 and perpendicular to the direction of gravity. However, it is understood that in alternative embodiments the corrugations may include a non-zero angle with a horizontal plane perpendicular to the direction of gravity. Alternatively, the guide members 103 may be produced in a moulding or casting process. The protrusions 106a and deepenings 106b may then be formed during production of the guide members 103. For example, a die or mould used to produce the guide members 103 may comprise corresponding deepenings and protrusions for forming the protrusions 106a and the deepenings 106b of the surfaces 105 of the guide members 103, respectively.

As illustrated in FIG. 1, the protrusions 106a and deepenings 106b of the surfaces 105 of the guide members 103 form a periodic pattern or are arranged in a periodic pattern. Here, the illustrated section of the surfaces 105 in a plane parallel to a vertical direction has a saw tooth profile. The sectional plane of FIG. 1 extends perpendicular to the guide members 103 and in parallel to a vertical direction defined by the direction of gravity. Edges of the saw tooth profile may have a rounded shape. More specifically, the surfaces 105 of the guide members 103 each include a plurality of first surface portions 105a and a plurality of second surface portions 105b. In a direction of fluid flow or lubricant flow along the surfaces 105 of the guide members 103 under the influence of gravity or exclusively under the influence of gravity, the first surface portions 105a extend from valleys formed by the deepenings 106b to neighboring crests formed by the protrusions 106a, respectively. Conversely, in a direction of fluid flow or lubricant flow along the surfaces 105 of the guide members 103 under the influence of gravity or exclusively under the influence of gravity, the second surface portions 105b extend from the crests formed by the protrusions 106a to neighboring valleys formed by the deepenings 106b, respectively.

In order to effectively slow the flow of lubricant along the surfaces 105 of the guide members 103, the guide members 103 may be formed and arranged such that a maximum slope of the first surface portions 105a with respect to a horizontal plane 107 encloses only a small angle $\alpha_1$ with the horizontal plane 107. The horizontal plane 107 is arranged perpendicular to the direction of gravity. For example, the angle $\alpha_1$ may be at most 10 degrees or at most 5 degrees. Additionally or alternatively, the angle $\alpha_1$ may be at least 1.5 degrees. Further, the guide members 103 may be formed and arranged such that a maximum slope of the second surface portions 105b with respect to the horizontal plane 107 encloses an angle $\alpha_2$ of at most 30 degrees or of at most 45 degrees with the horizontal plane 107. Additionally or alternatively, the angle $\alpha_2$ may be at least 5 degrees, at least 10 degrees, or at least 20 degrees. And an angle $\alpha_3$ enclosed by a maximum slope of the first surface portions 105a and a maximum slope of the second surface portions 105b with respect to the horizontal plane 107 may be between 10 degrees and 55 degrees, for example.

Figure 2A:
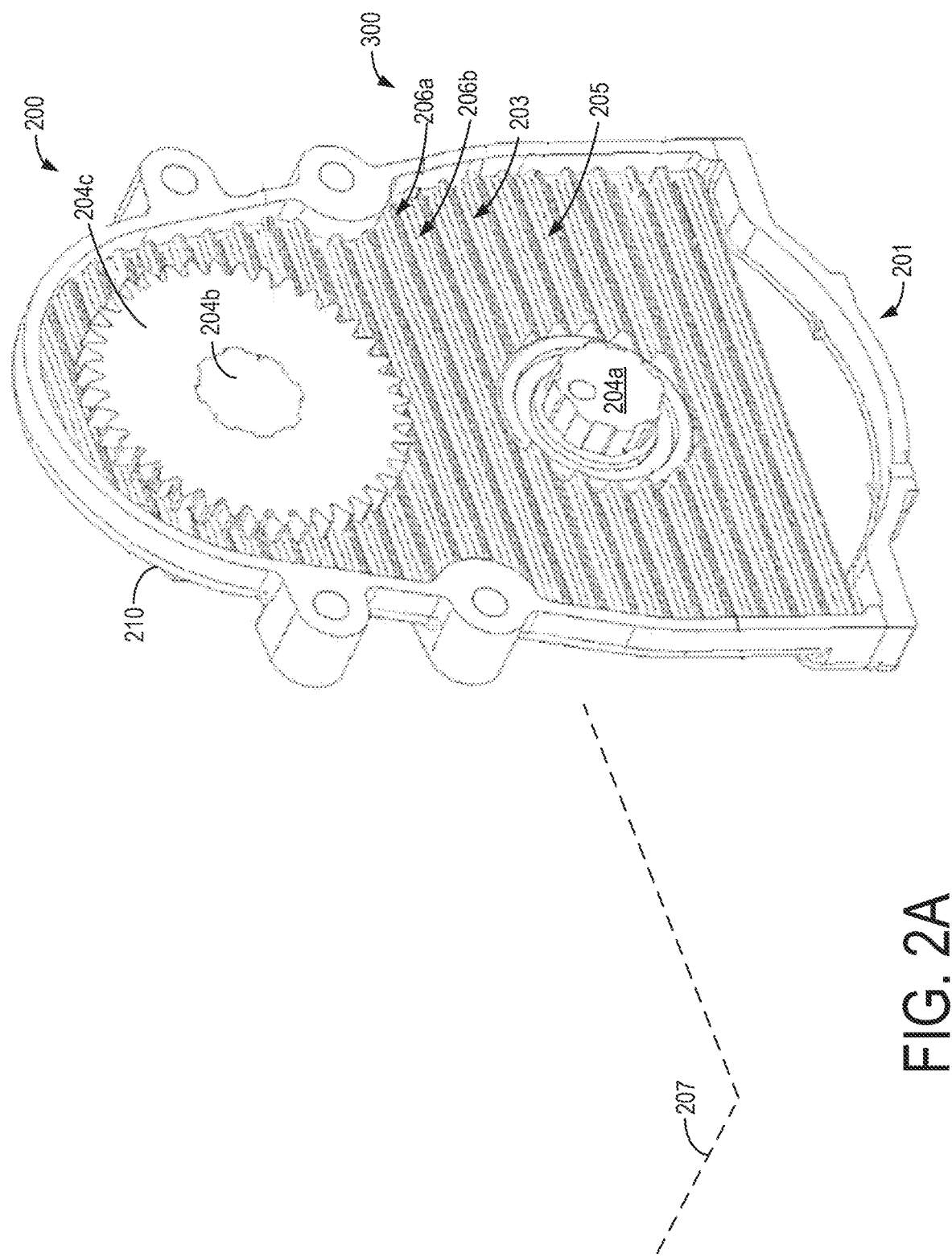
FIG. 2A schematically shows a perspective view of a lubricant collection assembly including a fluid sump and a guide member for guiding fluid into the lubricant sump according to a second embodiment.
Figure 2B:
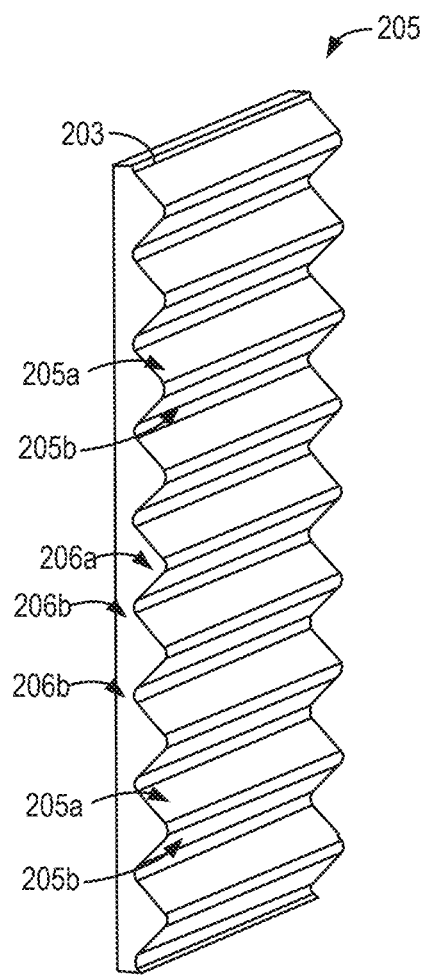
FIG. 2B schematically shows a perspective view of the guide member of FIG. 2A.
Figure 2C:
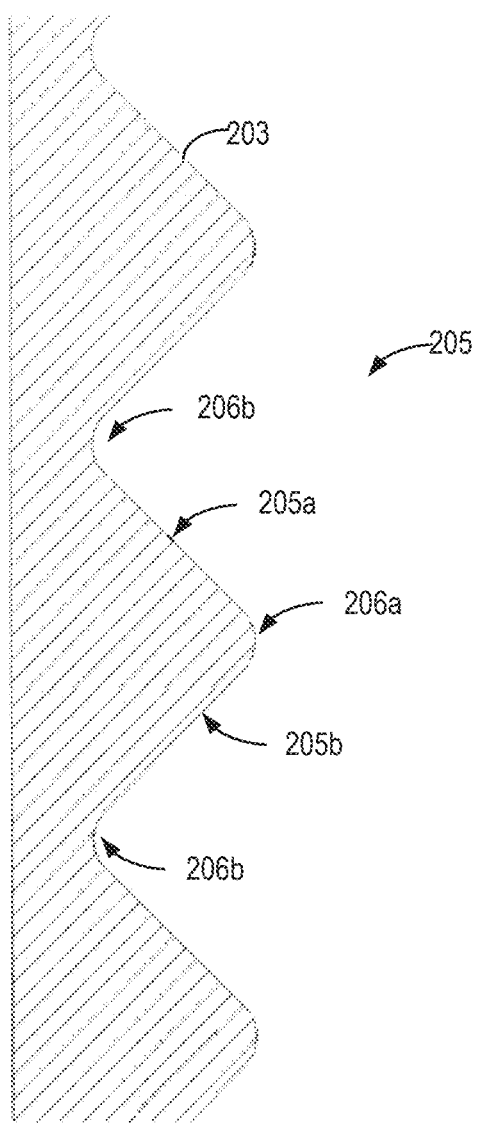
FIG. 2C schematically shows a sectional view of the guide member of FIG. 2A.

FIG. 2A schematically shows a perspective view of a lubricant collection assembly 200 according to a second embodiment. FIG. 2B schematically shows a perspective view of a portion of the guide member 203 of the lubricant collection assembly 200 of FIG. 2A, and FIG. 2C schematically shows a sectional view of a portion of the same guide member 203. Here and in all of the following, features recurring in different figures are designated with the same reference signs or with similar reference signs. The lubricant collection assembly 200 includes a lubricant sump 201 and a guide member 203 configured to guide a lubricant toward and/or into the lubricant sump 201 along a surface 205 of the guide member 203 under the influence of gravity or exclusively under the influence of gravity. The guide member 203 extends in a generally vertical direction above the lubricant sump 201. The lubricant collection assembly 200 further includes a housing 210 inside of which the lubricant sump 201 is formed. For example, the housing 210 may house an automotive transmission. The housing 210 may be made of cast iron. The guide member 203 may be formed in one piece with the housing 210. Alternatively, the guide member 203 may be configured as a separate inlay which may be fixed to an inner wall of the housing 210. Rotatable shafts 204a, 204b are mounted and/or supported on the housing 210. The shafts 204a, 204b may carry gears which may be in mesh with each other. As an example, FIG. 2A illustrates a gear 204c mounted on the shaft 204b.

The surface 205 of guide member 203 along which lubricant may be guided toward the lubricant sump 201 has a corrugated shape. The wave-like corrugations of the surface 205 of the guide member 203 extend in parallel or essentially in parallel to a horizontal plane 207, the horizontal plane being arranged perpendicular to the direction of gravity. Crests and valleys of the corrugated surface 205 form a plurality of protrusions 206a and deepenings 206b which slow the flow of lubricant along the corrugated surface 205.

As illustrated in FIGS. 2B and 2C and similar to the embodiment depicted in FIG. 1, the surface 205 of the guide member 203 of the lubricant collection assembly 200 includes a plurality of first surface portions 205a and a plurality of second surface portions 205b. Again, in a direction of fluid flow or lubricant flow along the surface 205 of the guide member 203 under the influence of gravity or, equivalently, in a sectional plane arranged perpendicular to the guide member 203 and in parallel to the vertical direction, the first surface portions 205a extend from valleys formed by the deepenings 206b to neighboring crests formed by the protrusions 206a, respectively. Conversely, in a direction of fluid flow or lubricant flow along the surface 205 of the guide member 203 under the influence of gravity or exclusively under the influence of gravity, or, equivalently, in a sectional plane arranged perpendicular to the guide member 203 and in parallel to the vertical direction, the second surface portions 205b extend from the crests formed by the protrusions 206a to neighboring valleys formed by the deepenings 206b, respectively.

Figure 2D:
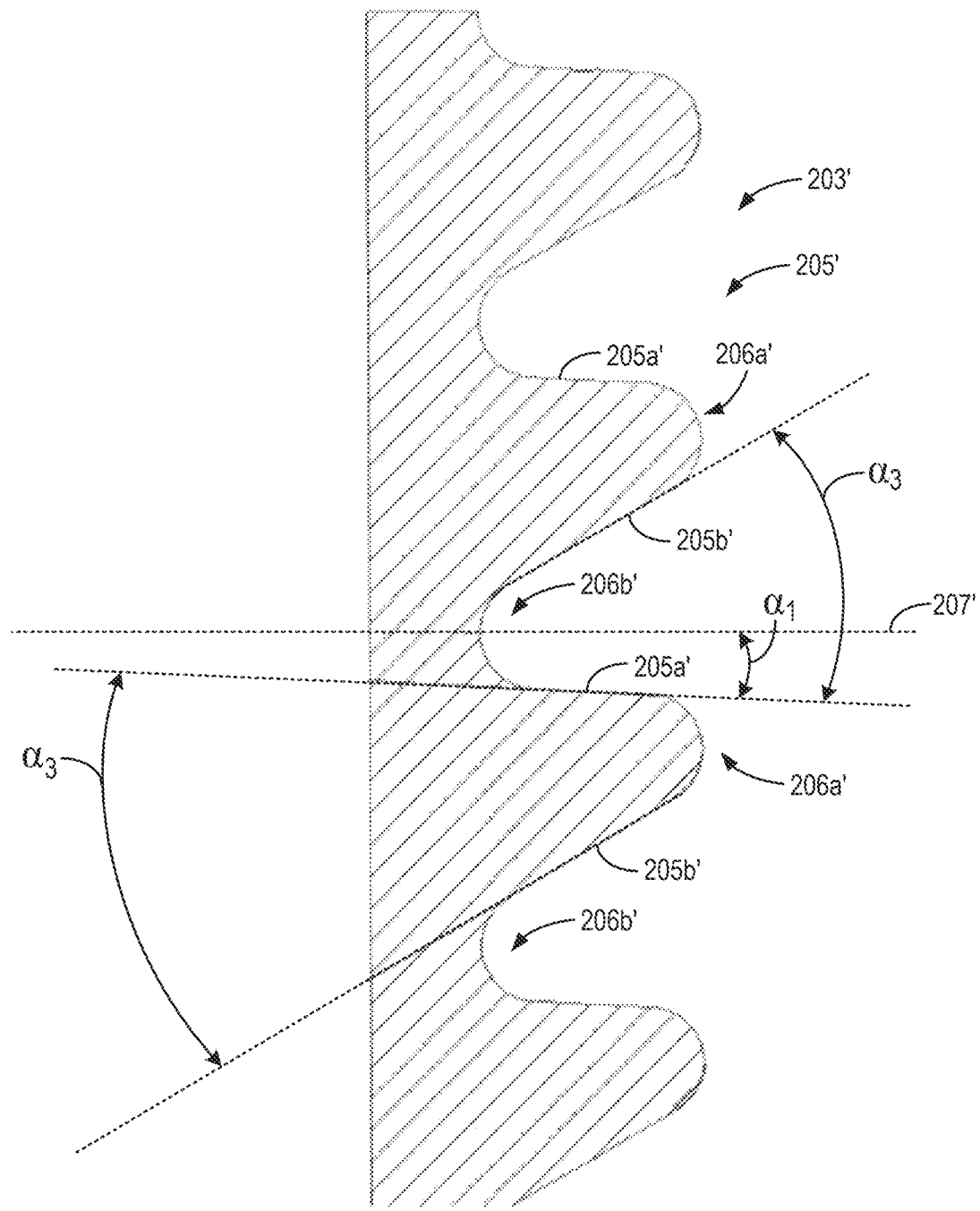
FIG. 2D schematically shows a sectional view of a variation of the guide member of FIG. 2A.

FIG. 2D schematically shows a sectional view of a portion of a guide member 203' which is a variation of the guide member 203 of FIGS. 2A-C. Similar to the guide member 203 of FIGS. 2A-C, a surface 205' of the guide member 203' of FIG. 2D has a periodic corrugated shape, wherein the corrugations form a plurality of protrusions 206a' and deepenings 206b', first surface portions 205a' and second surface portions 205b'. As illustrated in FIG. 2D, a maximum slope of the first surface portions 205a' of the guide member 203' encloses an angle $\alpha_1$ of about 3 degrees with a horizontal plane 207' perpendicular to the direction of gravity. The same maximum slope of the first surface portions 205a' of the guide member 203' and a maximum slope of the second surface portions 205b' of the guide member 203' enclose an angle $\alpha_3$ of about 35 degrees.

Figure 3:
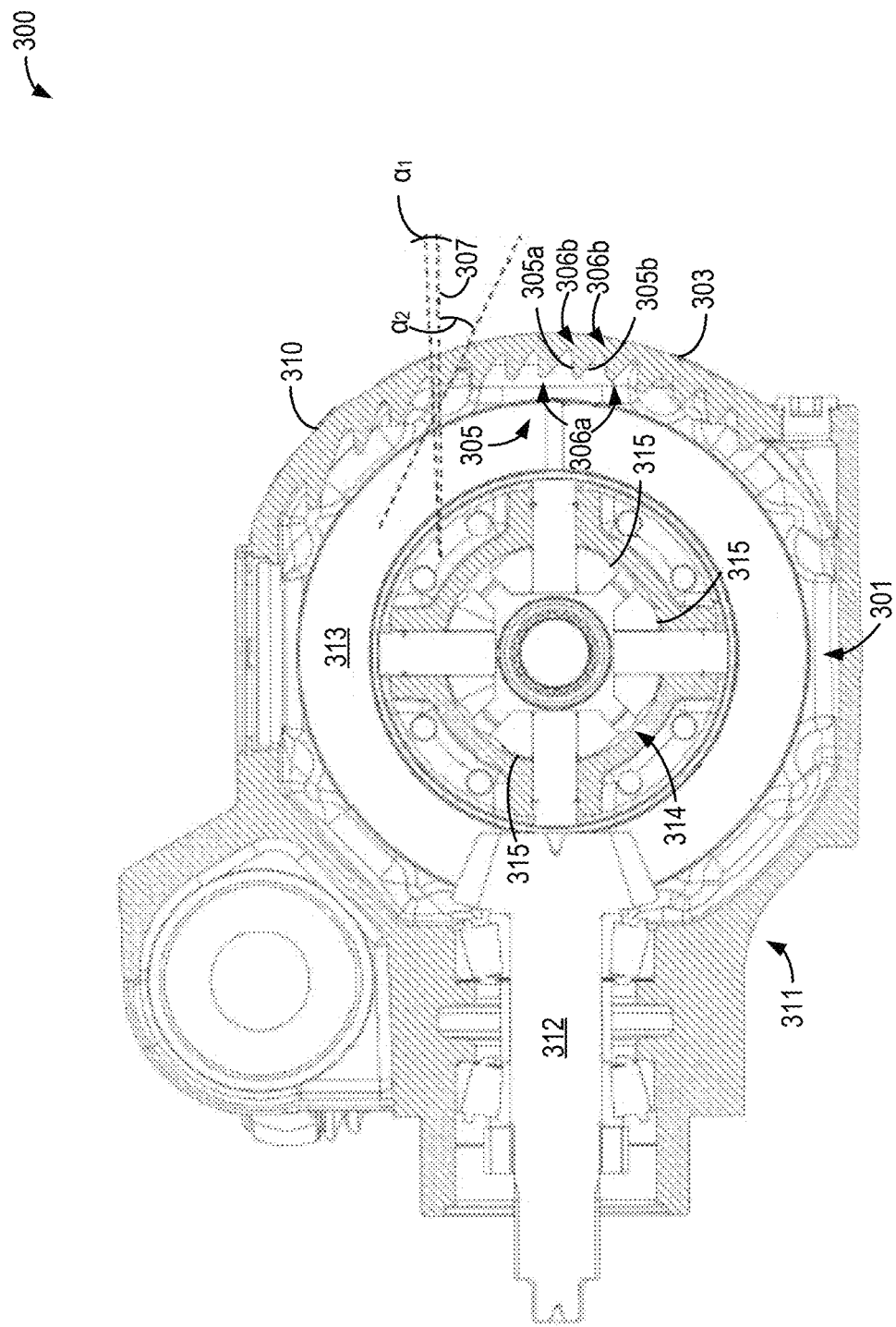
FIG. 3 schematically shows a sectional view of a lubricant collection assembly including a fluid sump and a guide member for guiding fluid into the lubricant sump according to a third embodiment.

FIG. 3 schematically shows a sectional view of a lubricant collection assembly 300 according to a third embodiment, wherein the sectional plane is arranged parallel to the direction of gravity. The lubricant collection assembly 300 includes an axle housing 310 and a differential assembly 311 disposed within the axle housing 310. Among other things, the differential assembly 311 includes a pinion gear 312 driving a crown gear 313, a differential case 314 connected to the crown gear 313, and a plurality of differential gears 315 rotatably mounted on the differential case 314. The axle housing 310 forms a lubricant sump 301 at a bottom thereof. An arcuate shaped inner wall of the axle housing 310 forms a guide member 303. The guide member 303 is disposed above or at least partially above the lubricant sump 301. At least the crown gear 313 may be partially submerged in a lubricant held in the lubricant sump 301. The crown gear 313 is configured such that upon rotation it conveys lubricant from the lubricant sump 301 onto a surface 305 of the guide member 303. Additionally or alternatively, the lubricant collection assembly 300 may also include a lubricant pump for conveying lubricant from the lubricant sump 301 onto the surface 305. The surface 305 of the guide member 303 is arranged such that it may guide lubricant toward and/or into the lubricant sump 301 under the influence of gravity or exclusively under the influence of gravity.

Similar to the guide members 103, 203, 203' shown in the previous embodiments, the surface 305 of the guide member 303 of FIG. 3 includes a plurality of protrusions 306a and deepenings 306b intended to slow a flow of lubricant along the surface 305 and toward the lubricant sump 301. In the direction of a fluid flow towards the lubricant sump 301 along the surface 305, first surface portions 305a extend from valleys formed by the deepenings 306b to neighboring crests formed by the protrusions 306a, and second surface portions 305b extend from the crests formed by the protrusions 306a to the neighboring valleys formed by the deepenings 306b, respectively. A maximum slope of the first surface portions 305a of the surface 305 with respect to a horizontal plane 307 generally encloses an angle $\alpha_1$ of at most 5 degrees or of at most 10 degrees with said horizontal plane 307. The horizontal plane 307 is arranged perpendicular to the direction of gravity. By contrast, a maximum slope of the second surface portions 305b of the surface 305 with respect to the horizontal plane 307 generally encloses an angle $\alpha_2$ with the horizontal plane 307. Generally, $\alpha_2 > \alpha_1$. For example, $\alpha_2 > 3 \cdot \alpha_1$, or $\alpha_2 > 5 \cdot \alpha_1$.

FIGS. 2A-2D, and FIG. 3 are drawn to scale, although other relative dimensions may be used if desired.

FIGS. 1-4 show example configurations with relative positioning of the various components. Unless otherwise noted, if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, the term "approximately" is construed to mean plus or minus five percent of the range unless otherwise specified.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. Lubricant collection assembly, comprising:
   a lubricant sump,
   at least one guide member having a surface configured to guide a lubricant toward and/or into the lubricant sump along the surface, wherein the surface includes a plurality of protrusions and/or deepenings to slow a flow of lubricant toward the lubricant sump; and
   wherein the surface of the at least one guide member comprises first surface portions, each of the first surface portions extending, in a direction of fluid flow along the surface of the at least one guide member under the influence of gravity, from a valley formed by one of the plurality of deepenings to a neighboring crest formed by one of the plurality of protrusions, and wherein a maximum slope of the first surface portions relative to a horizontal plane encloses an angle of between 1.5 degrees and 5 degrees with the horizontal plane.

2. The lubricant collection assembly according to claim 1, wherein the plurality of protrusions and/or deepenings are formed in one piece with the at least one guide member.

3. The lubricant collection assembly according to claim 1, further including one or more rotatable elements disposed at least partially in the lubricant sump and/or a lubricant pump, the one or more rotatable elements and/or the lubricant pump configured to convey a lubricant held within the lubricant sump onto the surface of the at least one guide member.

4. The lubricant collection assembly according to claim 3, further including a housing enclosing the lubricant sump, wherein the at least one rotatable element is mounted on the housing.

5. The lubricant collection assembly according to claim 4, wherein the at least one guide member is formed in one piece with the housing.

6. The lubricant collection assembly according to claim 1, wherein the plurality of protrusions and/or deepenings form a periodic pattern.

7. The lubricant collection assembly according to claim 1, wherein the at least one guide member has a corrugated surface.

8. The lubricant collection assembly according to claim 7, wherein the corrugated surface includes corrugations extending transverse to a direction of gravity.

9. The lubricant collection assembly according to claim 8, wherein the corrugations extend perpendicular to the direction of gravity.

10. The lubricant collection assembly according to claim 1, wherein the surface of the at least one guide member comprises second surface portions, each of the second surface portions extending, in a direction of fluid flow along the surface of the at least one guide member under the influence of gravity, from a crest formed by one of the plurality of protrusions to a neighboring valley formed by one of the plurality of deepenings, and wherein a maximum slope of the second surface portions with respect to a horizontal plane encloses an angle of between 10 degrees and 45 degrees with the horizontal plane.

11. The lubricant collection assembly according to claim 1, wherein the surface of the at least one guide member comprises first surface portions and second surface portions, each of the first surface portions extending, in a direction of fluid flow along the surface of the at least one guide member under the influence of gravity, from a valley formed by one of the plurality of deepenings to a neighboring crest formed by one of the plurality of protrusions, and each of the second surface portions extending, in a direction of fluid flow along the surface of the guide member under the influence of gravity, from a crest formed by one of the plurality of protrusions to a neighboring valley formed by one of the plurality of deepenings, and wherein a maximum slope of the first surface portions and a maximum slope of the second surface portions with respect to a horizontal plane enclose an angle of between 10 degrees and 55 degrees.

12. The lubricant collection assembly according to claim 1, wherein a section of the plurality of protrusions and/or deepenings parallel to a direction of gravity comprises a saw tooth profile.

13. The lubricant collection assembly according to claim 1, wherein the plurality of protrusions and/or deepenings have rounded edges.

14. The lubricant collection assembly according to claim 1, wherein the at least one guide member is made of metal, a sheet metal, cast iron, and/or a plastic material.

15. A collection system, comprising:
    a lubricant sump formed by side walls and a floor;
    a housing wherein the lubricant sump is formed;
    rotatable shafts mounted and/or supported on the housing wherein gears are coupled and meshed with each other;
    guide members arranged above or at least partially above the lubricant sump, the guide members extending from the side walls in a direction slightly inclined with respect to a vertical definition as defined by a direction of gravity and transitioning into the side walls;
    wherein at least some of the lubricant is conveyed upward and onto surfaces of the guide members in response to rotation of the gears; and
    wherein the surfaces of the guide members include corrugations forming a plurality of protrusions and a plurality of deepenings and a plurality of first surface portions and a plurality of second surface portions to slow flow of the lubricant.

16. The system of claim 15, wherein the guide member is formed in one piece with the housing or configured as a separate inlay fixed to an inner wall of the housing and the housing is an automotive transmission.

17. The system of claim 15, wherein the gears comprise a first gear partially submerged in the lubricant located in the lubricant sump, and wherein the first gear meshes with a second gear and the second gear meshes with a third gear.

* * * * *